United States Patent [19]

Stenzenberger

[11] Patent Number: 4,587,281

[45] Date of Patent: May 6, 1986

[54] MODIFIED THERMOSETTING IMIDE RESINS WITH IMPROVED FRACTURE TOUGHNESS

[75] Inventor: Horst Stenzenberger, Schriesheim, Fed. Rep. of Germany

[73] Assignee: The Boots Company PLC, England

[21] Appl. No.: 706,613

[22] Filed: Feb. 28, 1985

Related U.S. Application Data

[62] Division of Ser. No. 437,794, Oct. 29, 1982, Pat. No. 4,520,145.

[30] Foreign Application Priority Data

Jul. 21, 1982 [GB] United Kingdom ............... 8221116

[51] Int. Cl.$^4$ ............................................. C08G 18/00
[52] U.S. Cl. .................... 523/500; 428/411; 428/423.1; 523/508; 523/511; 524/874; 525/25; 525/26; 525/27; 528/59; 528/73
[58] Field of Search ............................... 428/411, 423.1; 523/500, 508, 511; 524/874; 525/25, 26, 27; 528/59, 73

[56] References Cited

U.S. PATENT DOCUMENTS

| | | |
|---|---|---|
| 3,779,996 | 12/1973 | Pauze . |
| 4,302,572 | 11/1981 | Locatelli et al. ...................... 528/53 |
| 4,342,860 | 8/1982 | Locatelli et al. ...................... 528/59 |
| 4,342,861 | 8/1982 | Locatelli et al. ...................... 528/59 |

FOREIGN PATENT DOCUMENTS

| | | |
|---|---|---|
| 32644 | 7/1981 | European Pat. Off. . |
| 1066390 | 4/1967 | United Kingdom . |
| 1443067 | 7/1976 | United Kingdom . |
| 2009767 | 12/1978 | United Kingdom . |
| 2011920 | 12/1978 | United Kingdom . |

*Primary Examiner*—Maurice J. Welsh
*Attorney, Agent, or Firm*—Robert J. Koch

[57] ABSTRACT

Bisimide resins having improved fracture toughness and resistance to microcracking comprise a mixture of,
(a) a bisimide of the general formula (I)

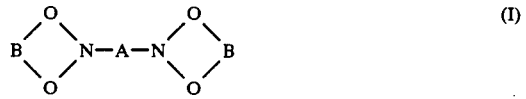

in which B represents a divalent radical containing a carbon-carbon double bond and A is a divalent radical containing at least two carbon atoms and
(b) a polyisocyanate of the general formula (II)

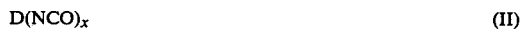

in which x has a value of between 2 and 4 and D stands for an x-valent radical.

15 Claims, No Drawings

MODIFIED THERMOSETTING IMIDE RESINS WITH IMPROVED FRACTURE TOUGHNESS

This is a division of application Ser. No. 437,794, filed Oct. 29, 1982 and now U.S. Pat. No. 4,520,145.

From British Patent Specification No. 1066390 it is known that bismaleimides of the general formula A,

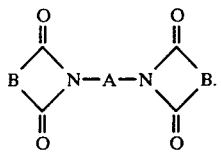

(A)

in which the radical B represents a divalent organic radical containing a carbon-carbon double bond, and A represents a divalent organic radical of at least two carbon atoms, can be crosslinked by simply heating them to temperatures between 100° and 400° C., providing materials with outstanding high temperature stability. Other imide resins can be obtained according to British Patent Specification No. 1190718 by reacting a bismaleimide of the general formula A with a diamino compound of the general formula B

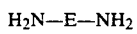   B in which E represents a divalent organic radical of at least two carbon atoms.

Other examples of imide resins are obtained by reacting bismaleimides with dihydrazides (British Patent Application No. 2011920A or amino acid hydrazides (British Patent Application No. 2009767A) or azomethines (British Patent Specification No. 1443067).

The so-called BI-type resins, some of which are the subjects of the above mentioned patents, are highly crosslinked when finally cured and exhibit low tensile strength, flexural strength and a low elongation at break. When these BI-type resins are used as matrix resins in crossplied graphite laminates the above mentioned combination of mechanical properties give rise to a phenomenon called "microcracks" which have a deleterious effect on the mechanical properties of the composites.

It is an object of the present invention to provide heat curable curable bisimide resins of the BI-type which when cured lead to heat resistant tough crosslinked polymers.

Another object of this invention is to provide BI-type curable bisimide resins which can be processed either from the belt or from solution together with fibres like glass, graphite or aramides to form composites showing significantly reduced microcracking.

It is a further object of this invention to provide BI-type laminating resins leading to composite with improved interlaminar fracture toughness.

The invention relates to new and improved thermosetting imide resins which are obtained by reaction of a bisimide of formula I

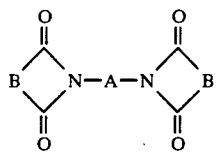 (I)

in which B is a bivalent radical containing a carbon-carbon double bond and A is bivalent radical having at least two carbon atoms with a polyisocyanate of the general formula (II),

 (II)

in which x has a value in the range 2 to 4 and D stands for an x-valent organic residue. The molar ratio a:b is greater than 5.25. The copolymerization of bisimide with polyisocyanates can be effected by simply heating a mixture of the two to temperatures between 100° and 350° C., long enough to finalize the reaction.

The radical designated A in general formula (I) may be (a) an alkylene group with up to 12 carbon atoms (b), a cycloalkylene group with 5 to 6 carbon atoms (c), a heterocyclic group with 4 to 5 carbon atoms and at least one nitrogen, oxygen or sulphur atom in the ring (d), a mono or dicarbocyclic group or (e) at least two mono or dicarbocyclic aromatic or cycloalkylene groups which are connected to one another by a direct carbon-carbon bond or by a bivalent group chosen from oxygen, sulphur, alkylene with one to three carbon atoms, or one of the groups of which the formulae are listed below, such as

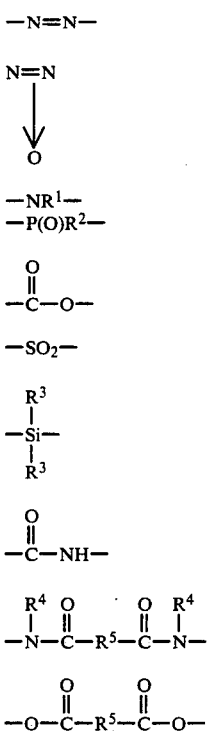

the radicals $R_1$, $R_2$, $R_3$, $R_4$, being alkyl groups with one to five carbon atoms, $R_5$ being an alkylene group or an arylene group.

The radical B in the general formula (I) represents a divalent organic radical containing a carbon-carbon double bond. The following structures are given as examples of the radical B.

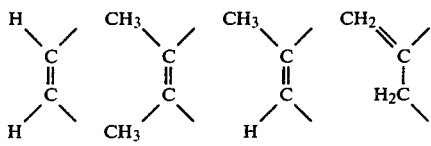

Bismaleimides which may for example be used for producing the new imide resins are 1,2-bismaleic imido ethane, 1,6-bismaleic imido hexane, 1,12-bismaleic imido dodecane, 1,6-bismaleic imido-(2,2,4-trimethyl)-hexane, 1,3-bismaleic imido benzene, 1,4-bismaleic imido benzene, 4,4' bismaleic imidodiphenyl methane, 4-4'-bismaleic imido diphenylether, 4,4'-bismaleic imido-diphenyl sulphide, 4,4'-bismaleic imido diphenyl sulphone, 4,4'-bismaleic imido-dicyclo hexyl methane, 2,4-bismaleic imido toluene, 2,6-bismaleic imido toluene, N,N'-m-xylylene bismaleic imide and N,N'-p-xylylene-bismaleic imide. Other suitable bisimides are N,N'-m-phenylene-bis-citraconomide, N,N'-4,4'-diphenyl methane-citraconimide, N,N'-4,4'-diphenyl methane-bisitaconomide.

A wide variety of organic polyisocyanates (II) may be employed to react with the bismaleimides of the general formula (I) including aromatic, aliphatic and cycloaliphatic polyisocyanates, referred to here as group 1 polyisocyanates. Representative compounds include toluene 2,6-diisocyanates, toluene 2,4-diisocyanate, m-phenylene diisocyanate, 4-chloro 1,3-phenylene diisocyanate, 4,4'-bisphenylene diisocyanate, 1,5-naphthylene diisocyanate, 4,4'-bisisocyanatodiphenyl methane, 2,4'-bisisocyanatodiphenyl methane, 4,4'-bisisocyanatodiphenyl ether, 4,4'-bisisocyanatodiphenylsulphone, 3,3-diisocyanatodiphenylsulphone, 4,4'-bisisocyanatodiphenylsulphide, and aliphatic diisocyanates such as 1,4-tetramethylene diisocyanate, 1,6-hexamethylene diisocyanate, 1,10-decamethylene diisocyanate, 2,2,4-trimethyl hexamethylene diisocyanate, 1,4-cyclohexylene diisocyanate, 4,4'-methylene-bis-(cyclohexyl) isocyanate), 1,5-tetrahydronaphthalene diisocyanate and isophorone diisocyanate; and any other polyisocyanate such as that given in general formula (V),

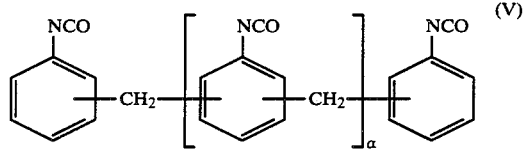

in which α has value between 0.1 and 2 may also be employed. Very advantageous polyisocyanates to be co-reacted with bismaleimides of formula I are those obtained by the reaction of a polyisocyanate of the aforementioned group 1 polyisocyanates with polyalkylene ether glycols, providing isocyanate-terminated macropolyisocyanates of the general formula (VI), referred to here as group 2 polyisocyanates,

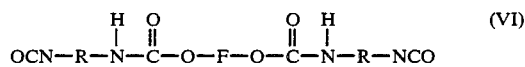

in which R represents a divalent organic aliphatic or aromatic residue and F stands for one of the following structures,

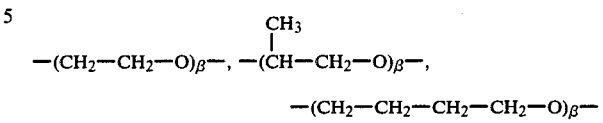

F representing polyalkylene ether backbone, β being number providing glycols having molecular weights of from 200 to 10,000. The group 2 polyisocyanates (VI) are well known substances and their preparations described in detail in Kunststoffhandbuch, Band VII, p. 84–85, Carl Hanser Verlag, Müchen 1966; they may be used in quantities up to 80% of the total resin mixture.

The residue F in the general formula (VI) can also be a polyester backone, and the preparation of polyisocyanates of formula (VI) with a polyester backbone is described in Kunststoffhandbuch, Band VII, p. 60–72, Carl Hanser Verlag, München 1966.

The preparation of the new curable bisimide resins can be carried out in an inert organic solvent or diluent, for example in dimethyl formamide, dimethylacetamide, N-methyl pyrididone and tetramethyl urea, or ketone type solvents such as acetone, methyl-ethyl ketone, methyl isobutyl ketone and cyclohexanone or chlorinated solvents such as methylene chloride, ethyl chloride, 1,2-dichloroethane and ether-type solvents such as dioxane, tetrahydrofuran ethyl glycol and ester type solvents such as ethyl acetate or mixed glycol etheresters such as ethyl glycol acetate, diethylene glycol diethyl ether, diethylene glycol monoethyl ether acetate etc. in such a manner that prepolymer solutions are obtained. The prepolymer can be isolated by stripping off the solvent either in vacuum or by heat or both, thus providing a solventless resin that can either be processed from the melt or as a powder.

The preparation of the new curable bisimide resins can be performed by using conventional techniques for mixing and grinding of powders or powders and liquids to intimately blend the bisimides with the polyisocyanates. Prepolymers are obtained by heating and homogeneous mixture at a temperature between 80° and 180° C., for sufficient time to produce a still formable and soluble product.

The production of the new curable bisimide resins according to this invention can also be carried out in inert diluents in which either only one of the starting materials is completely soluble or all the starting components are completely soluble. The latter procedure is preferred when the application of the resin requires a solution as is the case for the production of prepregs.

For many industrial applications of the new curable bisimide resins, it is advantageous to accelerate the curing process by adding catalysts. Effective curing catalysts are organic peroxides such as ditertiary butyl peroxide, diamyl peroxide, t-butyl perbenzoate in the concentration of 0.05 to 0.5% in relation to the total weight of the curable imide resin. Other catalysts that may be used are tertiary amines like N,N'-dimethylaniline, N,N'-dimethylbenzylamine, N-methylmorpholine, tri-n-butylamine, tri-methylamine and azabicylooctane and others.

The catalysts can be admixed with the components of the curable bisimide resins or they may be added during the production of the prepolymers either by a powder blending process or by the solvent blending process described above.

In many cases it is necessary to process the new curable bisimide resins from the melt. To reduce the melt viscosity and to improve the pot life the resins can be blended with so-called reactive diluents, preferably those that are liquid at room temperature. The reactive diluents that may be employed carry one or more polymerizable double bonds of the general formula $$CH_2=C< \qquad (III)$$

and may be of the vinyl-, allyl- or acryl-type. These reactive diluents can be of the ether, ester, hydrocarbon or heterocyclic type.

Typical esters are vinyl, allyl, methally, 1-chlorallyl-, crotyl-, isopropenyl esters derived from saturated or unsaturated aliphatic or aromatic mono- or polycarboxylic acids like formic, acetic, propionic, butyric, oxalic, malonic, adipic, sebacic, acrylic, methacrylic, phenylacrylic, crotonic, maleic, fumaric, itaconic, citraconic, tetrahydrophthalic, benzoic, phenylacetic, o-phthalic, isophthalic, terephthalic and naphthalic-dicarboxylic acid or mixtures thereof.

Typical ethers that may be employed are vinylallylether, diallylether, methylallyl ether and vinylphenylether.

The most important hydrocarbon type reactive diluents to be used are styrene, methylstyrene, vinylhexane, vinylcyclohexane, divinylbenzene, divinyl cyclohexane, diallybenzene, vinyltoluene and 1-vinyl-4-ethylbenzene or mixtures thereof.

In those cases where reactive diluents are used it is possible to first blend the bismalemide components with the reactive diluent and then the polyisocyanate component is added. In those case where the polyisocyanates of the group 2 are used to modify the bisimide resins the polyisocyanate is preferably dissolved in the reactive diluent and then blended with the bismaleimide compounds. The quantity of reactive diluent that may be employed can be up to 80% of the total final resin mixture.

The new curable bisimide resins can be further modified with unsaturated polyester resins. Useful unsaturated polyesters are well known products which are prepared by polycondensation of ethylenically unsaturated polycarboxylic acid derivatives such as esters with polyglycols as described in detail in Kunststoffhandbuch, Band VII, p. 247–282, Carl Hanser Verlag, München 1973.

Solutions of these polyesters in the reactive diluents described above can be used instead of the reactive diluent alone to modify the new curable bisimide resins.

Very advantageous reactive diluents are styrene and divinylbenzene which are used in quantities up to 30% of the total curable bisimide mixture. Care has to be taken with these diluents because they crosslink at very low temperatures, at around 100°–110° C., therefore mixtures containing these diluents have to be prepared at temperatures well below 100° C.

The new curable bisimide mixture either modified or not can be thermally converted to crosslinked polyimide-isocyanate copolymers by heating them to temperatures of between 100° and 400° C., for a time sufficient to complete cure.

The new curable bisimide resins are advantageously used to produce laminated materials. In such a case the prepolymers formed from the curable bisimide resin are dissolved in suitable solvents to provide a 50–60% by weight solutions, which is used to impregnate glass fibres in the form of fabrics or rovings or carbon fibres or boron fibres or organic synthetic fibres in the form of fabrics, filaments or rovings are impregnated with this solution and then stripped of the solvent by drying after which they are moulded into laminate form by the application of pressure and temperature, the crosslinked polyimide-isocyanate copolymers being the binder.

The imide resins according to the invention can also be processed by the known methods of the powder moulding industry in relation to curable compositions, to produce mouldings, curing out taking place with simultaneous shaping under pressure. For these applications, it is possible to admix with the curable bisimide resins additives such as fillers, colourants, softeners and flameproofing agents. Ideal fillers are for example glass fibres, carbon fibres, organic high modulus fibres such as aramides, quartz flour, kaolin, silica and metals in the form of fine powders.

It is possible to modify the heat-resistance, flexibility and toughnes of the resins by varying the molar proportions of the bismaleimides and the polyisocyanates over a whole range, and furthermore mixtures of two or more bismaleimides may also be used.

Accordingly, the following examples are selected to demonstrate the advantageous utility of the new resins and compositions but are not limited to them.

EXAMPLE 1

100 g of 4,4′-bismaleimidodiphenyl methane, 40 g of (2,4-2,6)-bismaleimidotoluene and 20 g of 4,4′-diisocyanatodiphenylmethane are mixed intimately by use of a ball mill. The mixture thus obtained is heated to 145° C., providing a viscous melt which can be processed as follows:

(a) The molten mixture of the reactants is poured into a casting mould measuring 100×100×mm to form a plate which is hardened over two hours at 170° C., and for an additional 3 hours at 200° C. After removal from the mould the plate is postcured for 15 hours at 250° C. The plate then is cut into test pieces (40×10×3 mm) and tested according to DIN 53452 in a three point flexured test. The flexured strength obtained is 90 N/mm², the flexured modulus is 4,8 KN/mm². After 1000 hours ageing in circulating air at 220° C. the remaining properties are:

| flexural strength | 92 N/mm² |
|---|---|
| flexural modulus | 4.8 KN/mm² | indicating extremely good thermal oxidative stability.

(b) The molten mixture of the reactants is heated for 1 hour at 180° C. thus providing after grinding a prepolymer powder which can be cured in a cylindrical mould at a temperature of 180°–220° C. The moulding pressure necessary to obtain a dense void free specimen is 300–500 N/mm². The flexural strength of the moulding measured is 120 N/mm²; the flexural modulus was found to be 4600 N/mm².

(c) The intimate mixture of 4,4′-bismaleimidodiphenyl methane obtained by ball milling as described above, (2,4-2,6)-bismaleimidotoluene and 4,4′-diisocyanatodiphenyl methane is dissolved in methylene chloride-ethylglycol acetate mixture as a solvent to form a low viscosity solution containing 60% by weight of resin. This solution is used to impregnate glass fabric type 92111/A1100 of Messrs. Interglas, thus providing after stripping off the solvent in a circulating air oven at 100° C., for ten minutes, a prepreg containing 35 to 37% by weight of resin. The prepreg pieces are stacked in a heated platen press and cured at 200° C. for 4 hours, providing a laminate in which the crosslinked polyimide-isocyanate copolymer is the binder. After postcure at 250° C., the laminate shows the following proper ties.

| | |
|---|---|
| Fibre content | 65% |
| Resin content | 35% by weight |
| Density | 1.95 g/cm$^3$ |
| Flexural Strength at room temperature | 590 N/mm$^2$ |
| Flexural Strength at 250° C. | 410 N/mm$^2$ |
| Flexural Modulus at room temperature | 28 KN/mm$^2$ |
| Flexural Modulus at 250° C. | 24 KN/mm$^2$ |
| Short beam shear strength | 51 N/mm$^2$ |
| Short beam shear strength at 250° C. | 38 N/mm$^2$ |

EXAMPLE 2

56 g of 4,4'-bismaleimidodiphenyl methane, 24 g of 2,4-bismaleimidotoluene and 20 g of 2,2,4-trimethylhexamethylene bismaleimide are melted in a round bottomed flask at 150° C. and degassed to form a clear transparent melt. The melt thus obtained is dissolved in methylene chloride at room temperature and blended with 40 g of a 50% by weight solution of 2,4-2,6diisocyanatotoluene in methylene chloride, also containing 20 g of divinyl benzene. The mixture is heated progressively to a temperature of 75° C., finally a vacuum is used to strip off traces of solvent, thus providing a resin that can be processed according to Example 1, employing the melting casting technology.

EXAMPLE 3

A resin according to British Patent Application No. 2009767A, Example 1 is produced by blending 107.5 g (0.3 mols) of 4,4-bismaleimidodiphenylmethane and 18.12 g (0.12 mols) m-aminobenzoic acid hydrazide in a ball mill after which the mixture is prereacted for 35 minutes in a drying cabinet at a temperature of 150° C. The homogeneous melt thus obtained is dissolved in N-methylpyrollidone to form a 50% by weight solution. This solution is blended with 4,4'-diisocyanatodiphenylmethane (0.1 mols) and used to produce glass fabric prepregs. Prepregs thus obtained are moulded at a pressure of 500 N/mm$^2$ at 200° C. for 4 hours to produce a laminate in which the new cured resin is the binder.

EXAMPLE 4

A resin according to British Patent Application No. 2009767A is produced by blending 56 g bismaleimidodiphenylmethane, 24 g of bismaleimidotoluene (2,4- and 2,6-isomeric mixture) and 10 g m-aminobenzoic acid hydrazide. To this resin a solution of 5 g of the macroisocyanate (mi) in 10 g diallylphthalate is added and heated to 110° C. while stirring, to form a highly viscous melt which is cast into a parallel epipedic mould and cured under a pressure of 2 bars for 12 hours at 180° C. After demoulding, the casting was postcured for 15 hours at 250° C., providing a resin sample containing no filler with the following properties:

| | RT | 250° C. |
|---|---|---|
| Density | 1.26 g/cm$^3$ | — |
| Flexural Strength | 110 N/mm$^2$ | 65 N/mm$^2$ |
| Flexural Modulus | 4.6 Kn/mm$^2$ | 2.9 KN/mm$^2$ |
| Flexural Strength after 1000 hours at 200° C. | 115 N/mm$^2$ | 58 N/mm$^2$ |
| Flexural Modulus after 1000 hours at 200° C. | 4.65 KN/mm$^2$ | 3.1 KN/mm$^2$ |

Preparation of the macroisocyanate (mi)

350 g of 4,4'-diisocyanatodiphenylmethane and 821 g of tetramethylene glycol (molecular weight 1000) are stirred and heated in a round bottomed flask under nitrogen gas at a temperature of 85° C., for 1.5 hours, providing a macroisocyanate showing an isocyanate content of $1.10^{-3}$ mols. g$^{-1}$.

EXAMPLE 5

A resin consisting of 60 parts of 4,4'-bismaleimidodiphenyl methane, 20 parts of toluene bismaleimide, 15 parts of 2,2,4-trimethylhexamethylene bismaleimide and 10 parts of 4,4-diisocyanatodiphenylmethane was preapred by melting blending at a temperature of 125° C. To this melt 15 parts of the polyester sold under the trade name Dobekan FT1018 by Bech & Co., Hamburg, dissolved in 15 parts of divinylbenzene were added and intimately mixed at 70°-80° C., for 15 minutes providing a resin melt which was cast into a parallel epipedic form and cured under pressure for 15 hours at 200° C. After postcured at 250° C., for 15 hours the casting showed the following properties.

| | RT | 250° C. |
|---|---|---|
| Density (g/cm$^3$) | 1.27 | — |
| Flexural Strength (N/mm$^2$) | 105 | 79 |
| Flexural Modulus (KN/mm$^2$) | 4.1 | 2.7 |
| Flexural Strength (N/mm$^2$) after 250 hours at 300° C. | 80 | 46 |
| Flexural Modulus (KN/mm$^2$) after 250 hours at 300° C. | 4.6 | 3.2 |

EXAMPLE 6

A resin consisting of 60 parts of 4,4'-bidmaleimidodiphenyl methane, 20 parts of toluene bismaleimide, 20 parts of 4,4- diisocyanatodiphenyl methane was prepared by melting blending at a temperature of 120° C. This melt was cooled down to a temperature of 70° C., blended with 15 parts of a solution of the macroisocyanate (mi) of Example 4 in divinylbenzene (1:2), providing a low viscosity melt at 80° C. This resin can be processed from the melt as described in Example 1, or can be dissolved in methylenechloride to form an impregnation varnish which is used to impregnate glass fabric squares (15×15 cm) which after drying in a circulating air oven at 40°-50° C. for 20 minutes provide glass fabric prepregs which contain 40% by weight of resin. These prepregs are stacked in a heated platen press between aluminum foils and cured at 170° C., for 2 hours at a pressure of 60 N/cm$^2$. The laminate thus obtained is postcured in a circulating air oven at a temperature of 250° C. for 16 hours. The laminate obtained shows the following properties:

| | |
|---|---|
| Resin content | 30% by weight |

-continued

| | |
|---|---|
| Density | 1.95 g/cm³ |
| Flexural strength at RT | 640 N/mm² |
| Flexural strength at 250° C. | 380 N/mm² |
| Flexural modulus at RT | 29.5 KN/mm² |
| Flexural modulus at 250° C. | 21.0 KN/mm² |
| Short beam shear strength RT | 58 N/mm² |
| Short beam shear strength at 250° C. | 41 N/mm² |

EXAMPLE 7

A resin consisting of 56 parts of 4,4'-bismaleimidodiphenylmethane, 24 parts of 2,4-bismaleimidotoluene and 40 parts of a styrene solution of the unsaturated polyester sold under the trade name Dobekan FT 1018 (1:1) is prepared by melting the components at 70°–80° C. After cooling the resin is dissolved in 120 parts of methylene chloride to which a solution of 5 parts of the macroisocyanate (mi) of Example 4 dissolved in 10 parts of methylene chloride is added under stirring to providing a homogeneous resin solution. Methylene chloride is stirred off in vacuum by use of a rotary evaporator and the final melt thus obtained is degassed in vacuum of 70°–75° C. The resin melt can be further processed as described in Example 1.

EXAMPLE 8

A resin consisting of 56 parts 4,4'-bismaleimidodiphenylmethane, 24 parts of 2,4-bismaleimidotoluene, 20 parts of 4,4-diisocyanatodiphenylmethane, and 30 parts of the unsaturated polyester sold under the trade name Dobekan FT 1018 are melt blended at 110° C. for 15 minutes, said melt being mixed with a solution of 0.7 parts of azobicyclooctane dissolved in 30 parts of diallyphthalate at a temperature of 70°–100° C. The resin thus obtained can be processed as follows:

(a) The molten mixture is poured into a mould as described in Example 1 and cured for 2 hours at 170° C., and 2 hours at 200° C. After demoulding the plate is postcured at 210° C. for 15 hours. The following properties are obtained.

| | |
|---|---|
| Flexural strength at 25° C. | 105 N/mm² |
| Flexural strength at 250° C. | 49 N/mm² |

(b) The molten resin mixture is heated for 1 hour at 165° C. thus providing after grinding, a prepolymer which can be cured in a cylindrical mould at temperatures of between 170°–210° C., and at pressures of 250–400 N/cm².

(c) 100 parts of the resin mixture prepared as described above is dissolved in 60 parts of acetone to form a low viscosity resin solution which is used to impregnate carbon fibre rovings (celion) 6000) and carbon fibre unidirectional tapes are prepared by a filament winding operation. The tapes are dried at 30° C. in circulating air and moulded in an autoclave at a pressure of 6 bars for 3 hours at 170° C. The unidirectional laminate obtained was postcured for 15 hours at 210° C. and showed the following properties.

| | |
|---|---|
| Density | 1.50 g/cm³ |
| Flexural strength at 25° C. | 2050 N/mm² |
| Flexural strength at 250° C. | 1350 N/mm² |
| Flexural modulus at 25° C. | 128 KN/mm² |
| Flexural modulus at 250° C. | 124 KN/mm² |
| Interlaminar shear strength at 25° C. | 95 N/mm² |
| Interlaminar shear strength at 250° C. | 52 N/mm² |

I claim:
1. Curable bisimide resins comprising a mixture of
(a) a bisimide of the general formula (I)

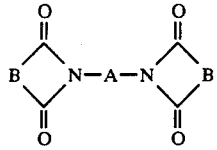

in which B represents a divalent radical containing a carbon-carbon double bond and A is a divalent radical containing at least two carbon atoms and
(b) a polyisocyanate of the general formula (II)

$$D(NCO)_x \quad (II)$$

in which x has a value in the range 2 to 4 and D stands for an x-valent radical, the molar ratio a:b being greater than 5.25.

2. Curable bisimide resins according to claim 1 containing a reactive diluent which carries at least one polymerizable double bond of the geneal formula (III)

$$CH_2=C< \quad (III)$$

which may be of the vinyl-, allyl-, acryl- or type.

3. Curable bisimide resins according to claim 1 in which the bisimide of the general formula (I)

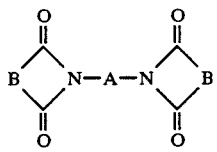

is characterized by
B being a group which is capable of addition polymerization selected from one of the following groups

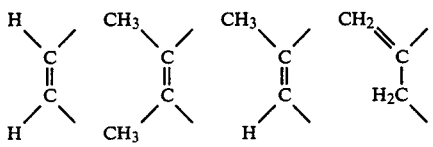

A being a member selected from the groups consisting of alkylene, cycloalkylene, arylene, at least two arylenes bonded to one another through a member selected from the group consisting of methylene —CH₂—, sulphone —SO₂—, and oxo —O—, at least two cycloalkylenes bonded to one another through a member selected from the group consisting of methylene —CH₂— sulphone —SO₂13, and oxo —O—, and such substituted alkylene-, cycloalkylene-, and arylene.

4. Curable bisimide resins according to claim 1 in which the polyisocyanate of the general formula (II)

$$D(NCO)_x \quad (II)$$

is selected from one of the following representative compounds:
toluene 2,6-diisocyanate,
toluene 2,4-diisocyanate,
m-phenylene diisocyanate,
4-chloro 1,3-phenylene diisocyanate,
4,4'-biphenylene diisocyanate,
1,5-naphthylene diisocyanate,
4,4'-bisisocyanatodiphenyl methane,
2,4'-bisisocyanatodiphenyl methane,
4,4'-bisisocyanatodiphenyl ether,
4,4'-bisisocyanatodiphenylsulphone,
3,3'-diisocyanatodiphenylsulphone,
4,4'-bisisocyanatodiphenylsulphide,
aliphatic diisocyanates such as 1,4-tetramethylene diisocyanate,
1,6-hexamethylene diisocyanate,
1,10-decamethylene diisocyanate,
2,2,4-trimethyl hexamethylene diisocyanate,
1,4-cyclohexylene diisocyanate,
4,4'-methylene-bis-(cyclohexyl isocyanate),
1,5-tetrahydronaphthalene diisocyanate,
and isophorone diisocyanate, or a polyisocyanate given in the general structure (V)

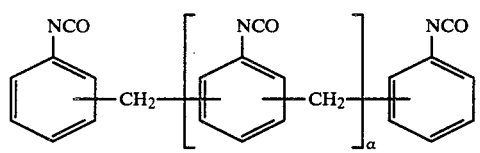
(V)

in which α has a value of between 0.1 to 2.

5. Curable bisimide resins according to claim 1 in which the polyisocyanate of the general formula (II)

D(NCO)$_x$        (II)

is a diisocyanate of the following structure (VI)

$$\text{OCN—R—N—C—O—F—O—C—N—R—NCO}$$
(with H, O, O, H above/below the C and N atoms) (VI)

in which R represents a divalent organic residue and F stands for a divalent polyalkylene ether glycol of the following structures,

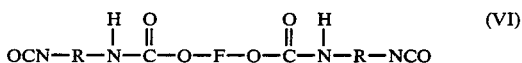

β being a number providing a molecular weight for the structure (VI) of between 200 and 10,000.

6. Curable resins according to claim 5 wherein the diisocyanate (VI) is present in quantities up to 80% of the total final resin mixture by weight.

7. Curable bisimide resins according to claim 2 in which the reactive diluent is one of the following compounds or mixtures thereof: styrene, methylstyrene, vinyltoluene, divinylbenzene, vinylcyclohexane, divinylcyclohexane, vinylpyridine, vinylpyrrolidone.

8. Curable resins according to claim 7 wherein the reactive diluent is present in quantities up to 80% of the total final resin mixture by weight.

9. Curable resins according to claim 8 wherein the reactive diluent is styrene or divinylbenzene, the reactive diluent being present in quantities up to 30% of the total final resin mixture by weight.

10. Curable bisimide resins according to claim 1 containing curing catalyst selected from one of the following compounds:
ditertiary butyl peroxide,
diamyl peroxide,
t-butyl perbenzoate,
N,N' dimethylbenzylamine,
N,N' dimethyl aniline
N-methylmorpholine,
tri-n-butylamine,
tri-methylamine and
azabicyclooctane and the like.

11. Curable resins according to claim 10 wherein a peroxide catalyst is present in the concentration of 0.05 to 0.5% of the total final resin mixture by weight.

12. Prepolymers of the resinous mixtures of claim 1 obtained by heating the said curable bisimide resins to temperatures of between 80° and 200° C. for a time sufficient to obtain a still formable product.

13. Prepolymers as in claim 12 wherein a catalyst is used and the resin mixture is in the melt form or in solution.

14. Crosslinked resins derived by heating the resin mixtures of claim 1 to temperatures of between 80° and 400° C. for a time sufficient to complete cure.

15. Crosslinked resins derived by heating the prepolymers of claim 12 to temperatures of between 80° and 400° C. for a time sufficient to complete cure.

* * * * *

UNITED STATES PATENT AND TRADEMARK OFFICE
CERTIFICATE OF CORRECTION

PATENT NO. : 4,587,281

DATED : May 6, 1986

INVENTOR(S) : Stenzenberger

It is certified that error appears in the above-identified patent and that said Letters Patent is hereby corrected as shown below:

IN THE ABSTRACT:

Delete formula (I) and insert therefor

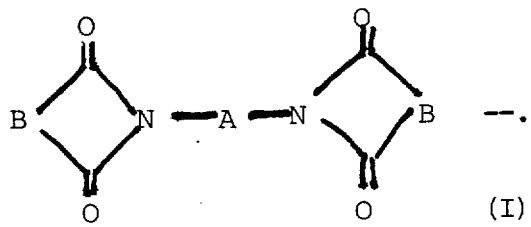

UNITED STATES PATENT AND TRADEMARK OFFICE
CERTIFICATE OF CORRECTION

PATENT NO. : 4,587,281

DATED : May 6, 1986

INVENTOR(S) : Stenzenberger

It is certified that error appears in the above-identified patent and that said Letters Patent is hereby corrected as shown below:

Column 1, line 53, after "curable" delete "curable".

Signed and Sealed this

Twenty-seventh Day of January, 1987

Attest:

DONALD J. QUIGG

Attesting Officer     Commissioner of Patents and Trademarks